US012342043B1

(12) United States Patent
Kini et al.

(10) Patent No.: US 12,342,043 B1
(45) Date of Patent: Jun. 24, 2025

(54) MACHINE LEARNING PIPELINE FOR CONTENT SELECTION

(71) Applicant: Amazon Technologies, Inc., Seattle, WA (US)

(72) Inventors: Venkataramana Kini, Cupertino, CA (US); Ravi Kiran Divvela, Issaquah, WA (US); Devendra Pratap Yadav, Seattle, WA (US); Fei Wang, Fremont, CA (US); Zhen Wen, Summit, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/410,916

(22) Filed: Jan. 11, 2024

(51) Int. Cl.
*H04N 21/466* (2011.01)
*H04N 21/482* (2011.01)

(52) U.S. Cl.
CPC ..... *H04N 21/4666* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 10,555,023 B1 * | 2/2020 | McCarthy | H04N 21/8549 |
| 2016/0014461 A1 * | 1/2016 | Leech | H04N 21/812 |
| | | | 725/14 |
| 2022/0321940 A1 * | 10/2022 | Christie | H04N 21/435 |
| 2023/0300396 A1 * | 9/2023 | Panchaksharaiah | |
| | | | H04N 21/2407 |
| | | | 725/14 |

OTHER PUBLICATIONS

Netflix TechBlog, "Learning a personalized homepage," retrieved from https://netflixtechblog.com/learning-a-personalized-homepage-aa8ec670359a, Oct. 26, 2023, pp. 1-20.

D. Agarwal, S. Chatterjee, Y. Yang, and L. Zhang. "Constrained optimization for homepage relevance," ACM, pp. 375-384, May 2015.

(Continued)

*Primary Examiner* — Junior O Mendoza
(74) *Attorney, Agent, or Firm* — Robert C. Kowert; Kowert, Hood, Munyon, Rankin & Goetzel, P.C.

(57) ABSTRACT

Embodiments of a content recommendation or selection system are described. The system uses a pipeline of machine learning models to select content for a user. In embodiments, a first user model generates a first score of content categories for the user based on short-term user data. A second user model generates a second score of the categories for the user based on long-term user data. The two scores are combined to select the categories to include on the content user interface. In embodiments, new categories are added to the recommendations based on an exploration-exploitation algorithm. In embodiments, content categories are organized on the user interface in a manner to promote neighborhood diversity. Advantageously, the machine learning pipeline enables independent configurability of various objectives of the content recommendation or selection system and reduces the amount of machine learning resources needed to implement the system.

20 Claims, 8 Drawing Sheets

(56) References Cited

OTHER PUBLICATIONS

S. Borzsony, D. Kossmann, and K. Stocker, "The skyline operator," Published in: Proceedings 17th International Conference on Data Engineering, pp. 421-430, Feb. 2001.

Carbonell and J. Goldstein, "The use of mmr, diversity-based reranking for reordering documents and producing summaries," In Proceedings of the 21st Annual International ACM SIGIR Conference on Research and Development in Information Retrieval, SIGIR '98, p. 335-336, New York, NY, USA, 1998. Association for Computing Machinery.

W. Ding, D. Govindaraj, and S. V. N. Vishwanathan, "Whole page optimization with local and global constraints," Applied Data Scient Track Paper, In KDD Aug. 2019, pp. 3153-3161.

M. Dudik, J. Langford, and L. Li, "Doubly robust policy evaluation and learning," Appearing in Proceedings of the 28th International Conference on Machine Learning, arXiv:1103.4601v2, pp. 1-9, 2011.

T. Graepel, J. Quiñonero Candela, T. Borchert, and R. Herbrich, "Web-scale bayesian click-through rate prediction for sponsored search advertising in microsoft's bing search engine," In Proceedings of the 27th International Conference on Machine Learning ICML 2010, Invited Applications Track (unreviewed, to appear), Jun. 2010. Invited Applications Track, pp. 1-8.

R. S. Sutton, et al., "Reinforcement learning: An introduction," Secind edition, in progress, From The MIT Press, 2014/2015, pp. 1-40.

S. Vargas and P. Castells, "Rank and relevance in novelty and diversity metrics for recommender systems," In Proceedings of the Fifth ACM Conference on Recommender Systems, RecSys '11, p. 109-116, New York, NY, USA, 2011. Association for Computing Machinery, 2011.

A. Vaswani, N. Shazeer, N. Parmar, J. Uszkoreit, L. Jones, A. N. Gomez, L. u. Kaiser, and I. Polosukhin, "Attention is all you need," In 31st Conference on Neural Information Processing Systems, NIPS 2017, pp. 1-11.

Q. Wen, T. Zhou, C. Zhang, W. Chen, Z. Ma, J. Yan, and L. Sun, "Transformers in time series: A survey," arXiv:2202.07125c5, May 2023, pp. 1-9.

N. Wu, B. Green, X. Ben, and S. O'Banion, "Deep transformer models for time series forecasting: The influenza prevalence case," Submitted to the 37th International Converence on Machine Learning, arXiv:2001.08317v1, Jan. 2020, pp. 1-10.

\* cited by examiner

MACHINE LEARNING PIPELINE FOR CONTENT SELECTION

BACKGROUND

With the advent of streaming services, users now have fast and convenient access to a wide variety of streaming content over the Internet. Streaming service providers offer content that can be acquired in a variety of ways, for example, through on-demand transactions or subscription to third-party channels. The content is typically made available via a user interface (e.g. a homepage) of the streaming service, which provides an ultimate "entertainment hub" for users to stream various types of content.

The streaming service user interface may be used to provide content recommendations to the user. The selection of content recommendations must balance of a number of competing objectives. For example, the recommendations should include some familiar types of content that the user is known to enjoy but also new content for the user to explore. Some streaming service providers have begun experimenting with machine learning systems to generate content recommendations. However, due to the complexities of the requirements involved, these recommendation systems are typically implemented with large models that are expensive to train and operate. Moreover, the behavior of large machine learning models is notoriously difficult to configure, and the decisions generated by these models are often difficult to explain. These problems hinder the usability and performance of content recommendation systems, particularly for large-scale streaming services that must make recommendations for many users and across large content libraries.

Figure 1:
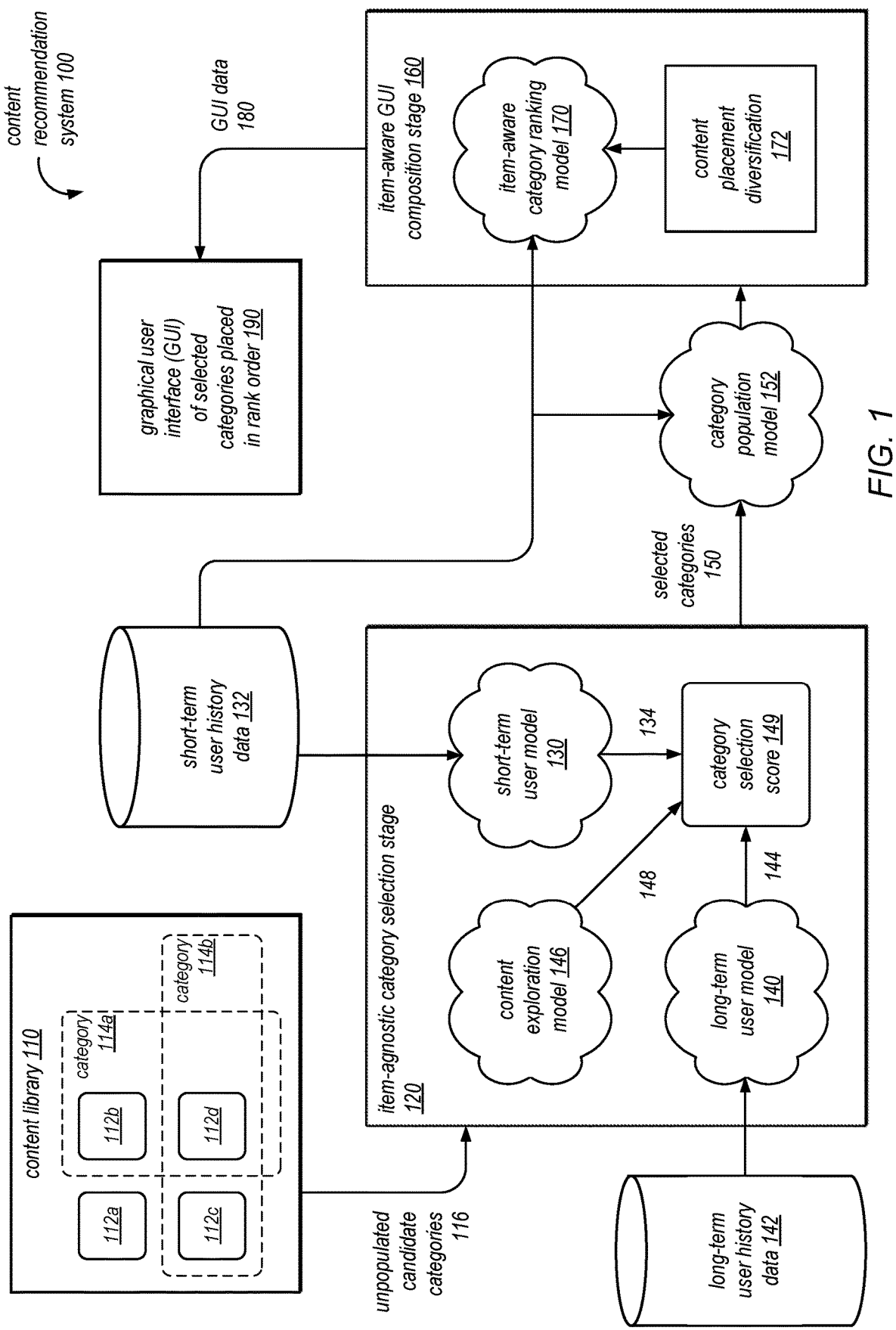
FIG. 1 is illustrating an embodiment of a content recommendation system for generating a graphical user interface (GUI) of recommended content using a pipeline of machine learning models, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Many streaming services allow users to select and stream digital content (e.g. movies) over the Internet via a user interface (e.g. a service homepage). The user interface may present content recommendations to the user (e.g. "Recommended for You," "You May Like," etc.). A typical user interface may consist of approximately 20 carousels of recommended content, where the top five to seven carousels receive the most attention from the user. The selection for what content is recommended on the user interface is a complex process that involves a number of competing objectives such as maximizing user engagement, encouraging user exploration, fairness across content categories, among others. Due to the abundance of content offered by streaming services and the number and complexity of rules involved in the selection process, practical implementation of such a recommendation system poses many unique challenges.

Recently, some streaming service providers have begun experimenting with machine learning systems to generate content recommendations. However, current implementations of these systems tend to use large monolithic models to learn large sets of recommendation objectives. The large models are expensive to train and operate in terms of compute resources and training data. Moreover, because the machine learning model encodes its knowledge as an inscrutable opaque box, the decisions that it generates cannot be easily interpreted or explained. Machine learning systems cannot be managed the same way as traditional software systems, and administration tasks such as fine-grained system configuration and testing are generally difficult in these systems.

To solve these and other problems in the state of the art, this disclosure describes a content recommendation or selection system that employs a pipeline of machine learning models. The pipeline architecture decomposes the recommendation selection process into a series of relatively small machine learning models, based on the logical objectives of the recommendation process. The output produced by the models are then combined through one or more configurable combining functions to generate the content recommendations for the user.

Advantageously, the pipeline architecture allows individual logical objectives of the content recommendation system to be separately configurable. For example, the relative importance of two recommendation objectives can be balanced by adjusting the weights of two associated models in the pipeline. As another example, the system may allow A/B testing to be performed on two user populations using two different sets of recommendation objectives. Moreover, because the recommendation objectives are implemented as distinct models, the system is able to easily generate human-understandable explanations of its recommendation decisions (e.g. why a particular content was chosen). Additionally, the described approach allows individual models in the pipeline to be evolved separately through parallel development processes and use less resources for model development and deployment (e.g. less computing resources and less training time and data).

In some embodiments, handling content data at individual title level poses data sparsity challenges. For example, when the streaming service offers a large number of titles, the input feature vectors used by the recommendation models can become very sparse. To address this issue, the recommendation process is separated into two stages: an item-agnostic content category selection stage and an item-aware GUI composition stage. The item-agnostic stage handles the data at a high level of granularity, at the content category level, so that data sparsity issues are reduced in the earlier stages of the pipeline. The content items may be categorized based on the content type (e.g. movie, show, live program, videogame, etc.) and the acquisition option for the item (free streaming, streaming with ads, on-demand purchasing or renting, or content channel subscription). Categorization may also be performed based on other content attributes, such as content genres (action, comedy, drama, horror), content length, content language, etc.

In some embodiments, the content category selection stage focuses on determining a set of relevant content categories for a given user under a specific context. The content category selection stage uses both short-term (e.g. weeks or months) and long-term (e.g. a year or more) user modeling to predict the probability of the user interacting with a content item from a given content category. The reason for using both short-term model and long-term modeling is that, from empirical data, the user's historical behavior (collected with user authorization) exhibits both short-term and long-term patterns. For example, a user may exhibit a weekly pattern of streaming a particular type of TV shows every Saturday, but also a longer, yearly pattern where the user watches a certain type of movie every year during the holiday months. These two types of patterns are better modeled separately so they can be captured more accurately using more focused models.

In some embodiments, the long-term user model used by the content recommendation system is a transformer model that consumes a time series of monthly user interaction data with different content categories over the past year. The transformer model processes the time series data to predict the user's interactions one month into the future. Categories with the highest predicted user interactions are scored highly for recommendation. Although different types of sequential models can be used for the long-term user modeling, the transformer neural network yielded the best performance in this context when compared to other types of machine learning models such as Multi-Layer Perceptron (MLP) models and Recurrent Neural Networks (RNN) using Long and Short Term Memory (LSTM).

In some embodiments, the content category selection stage may inject new content categories into the recommendations to enable the user to explore new content. These new content categories may include categories that the user is not aware of (e.g. categories that the user has not previously interacted with), but may be of interest to the user (e.g. as determined by other types of user data). To introduce these new content categories to the user, embodiments the system use a multi-arm bandit exploration algorithm in combination with the user history-based models. In some embodiments, the exploration algorithm uses an Upper Confidence Bound (UCB) method.

In some embodiments, the GUI composition stage is responsible for composing the GUI (e.g. the streaming service homepage) using the content categories selected by the category selection stage. The GUI composition stage may occur after the selected content categories are populated with selected content titles. The GUI composition stage may rank the populated content categories in an item-ware ranking process to determine the placement order of the content categories on the GUI. In some embodiments, the ranking is determined using an iterative process that repeatedly adds content categories to the GUI based on a marginal score, which is based on both the relevance of the category and a diversification score of the category for enhancing content diversification on the GUI. For example, the iterative process may be used to ensure that neighboring content categories placed within a neighborhood on the GUI satisfy specified diversification criteria.

As may be understood by those skilled in the art, embodiments of the inventive system described herein are specialized computer systems that implement functionality for generating content recommendations or performing other types of content selection. The disclosed system is a practical application of computer technology to, among other things, programmatically generate graphical user interfaces (e.g. homepages) with personalized content for the user. The disclosed system performs a series of machine learned tasks using machine learning models, which necessarily requires the use of computers and cannot be practically performed within the human mind and using pen and paper alone. The pipeline architecture described herein further improves the functioning of the machine learning system to, among other things, reduce the overall size of machine learning models, reduce the amount of time and data needed to train the models, reduce the amount of compute, memory, and storage resources needed to execute the models, and improve the configurability, testability, and interpretability of the models. The inventions of this disclosure are practical applications of computer systems to achieve technical benefits in the functioning of the computer, and are not directed to abstract subject matter outside of the computer realm, such as human mental processes, methods of organizing human activity, mathematical formulae or relationships, business or economic practices, or any other types of exceptions to patent-eligible subject matter recognized by the courts. Additional details and technical advantages of the disclosed inventions are described in further below, in connection with the figures.

FIG. 1 is illustrating an embodiment of a content recommendation system 100 for generating a graphical user interface (GUI) of recommended content using a pipeline of machine learning models, according to some embodiments.

As shown, the content recommendation system 100 uses a pipeline of machine learning models (here models 130, 140, 146, 152, and 170) to generate personalized recommendations for content items 112a-d stored in a content library 110. In some embodiments, the machine learning model pipeline shown may be implemented in other types of content management systems such as content search or reporting systems. The content items 112 may be different types of content provided by a streaming service provider, such as movies, shows, live programming, video games, music, and/or other types of media content. As shown, the content items 112 are categorized into different content categories, groupings, or classes 114a and 114b. The content 112 may be categorized, grouped, or classified based on a variety of content item properties, such as the content type, acquisition option (e.g. streaming with or without ads, on-demand transaction, content channel subscription, etc.), content length, content publication date, content language, content genre, etc. In some embodiments, each category may be shown as a display group (e.g. a carousel) on the recommendation user interface (e.g. graphical user interface 190) of the system. In some embodiments, the categories 114 may be determined dynamically during the content selection process, instead of being stored in the content library 110.

As shown, the content recommendation system divides the recommendation generation process into two stages: an item-agnostic category selection stage 120 and an item-aware GUI composition stage 160. The item-agnostic category selection stage is tasked with initially reading data about candidate content categories 116 from the content library 110 and using the data to select a set of content categories 150 for recommendation on the GUI 190. The item-agnostic category selection stage may be performed without populating the categories with content items or using content title-specific information. By handling only category-level data at the category selection stage 120, the system is able to reduce resources used for the stage and avoid data sparsity problems associated with using item-level data (e.g. needing to generate large feature vectors to represent a large number of titles).

As shown, the category selection stage 120 uses both a short-term user model 130 and a long-term user model 140 to generate a category selection score 149 for each of the candidate categories 116. In some embodiments, categories below a certain selection score threshold are filtered out at this stage 120, so that only a small set of selected categories 150 are processed in the subsequent stage 160.

In some embodiments, short-term user model 130 consumes short-term user history data 132 about a user to generate a short-term score 134 of individual candidate categories with respect to the user. The short-term score 134 may reflect a relevance of each candidate category to the user over a relatively short period (e.g. a past week or month). The short-term user history data 132 consumed by the model 130 may include the user's recent interaction history with each candidate category (e.g. a number of content items played from the category, total number of minutes played from the category, user ratings of items in the category, etc.). The short-term user history data 132 may or may not be consumed by the model 130 as a time series. In some embodiments, short-term user model 130 may also consume other types of input data, such as context data about the recommendations (e.g. time of day, day of week, properties about the user streaming device, etc.), or features about the user or an individual content category.

In some embodiments, the long-term user model 140 consumes long-term user history data 142 to generate a long-term score 144 of individual candidate categories 116 with respect to the user. The long-term score 144 may reflect a propensity of the user for interacting with each of the candidate categories 116 at a future time. The long-term user model 140 may be implemented as a multivariate time series forecasting model. For example, the long-term user history data 142 may be consumed by the long-term user model 140 as a time series or sequence of user interaction observations. In some embodiments, each time step in the time series represents a month of observed interactions by the user. The time series may include observations corresponding to the last twelve months, and the long-term user model 140 may be trained to predict the user's interactions for the next (thirteenth) month.

For example, supposed there are K different content categories available for recommendation. The K categories may be defined according to combinations of different properties of the categories (e.g. combinations of different content types and acquisition options). For each month t, a feature vector $y_{ut}$ is generated for the user u's interactions within that month (e.g. the user's aggregate number of streams of each category in that month). The feature vector may be denoted as $y_{ut}=[y_{utk}]_{k=1}^{K}$. The propensity model 140 accepts this feature vector as input and predicts a feature vector indicating the user's number of streams for the next month. In some embodiments, the output of the model 140 is normalized (e.g. as a probability) where the sum of all categories in the prediction vector sums to 1.

In some embodiments, the long-term user model 140 is implemented using a transformer neural network. Traditional time-series models such as ARIMA are not well suited for the task in this context, because these models do not always capture the long-term user interaction history adequately. Models such as standard recurrent neural networks (RNNs) with Long and Short Term Memory (LSTM) units can be used for time series forecasting. However, these types of networks do not adequately learn the long-term dependencies in the user's behavior. Based on empirical studies conducted by the inventors, a generative transformer network, which is traditionally used for Natural Language Processing (NLP) tasks, achieved the best performance as the forecasting model in this context. In some embodiments, the transformer model is implemented using attention mechanisms for modeling non-Markovian dynamics, and trained based on a multi-output regression algorithm using a Mean Squared Error (MSE) loss function. The results of the empirical study are shown in the table below:

| Model | MAPE (%) |
| --- | --- |
| MLP | 12.2 |
| RNN with LSTM | 7.8 |
| Transformer | 5.2 |

In the study, the different model architectures are evaluated using the Mean Absolute Percentage Error (MAPE) metric. Since the input data is a multivariate time series with respect to the different categories, the evaluation metric is extended to account for this aspect. In particular, the MAPE metric used is formulated as:

$$MAPE = \frac{100}{UK} \sum_u \sum_k \frac{|y_{uk} - \hat{y}_{uk}|}{y_{uk}} \qquad (1)$$

where U is the number of users, K is the number of distinct categories, and $y_{uk}$ and $\hat{y}_{uk}$ are the actual and predicted aggregate number of streams per category, respectively. The performance of prediction is measured using the MAPE metric, which provides an intuitive scale-free metric that accounts for significant variations in the scale of the users' content category consumption.

As shown, the study evaluated three different ML architectures for modeling user long-term propensity. The first one is a feed forward neural network implemented using Multi-Layer Perceptron (MLP); the second one is a Recurrent Neural Network (RNN) implemented using Long and Short Term Memory (LSTM); and the third one is a Transformer network. As can be seen from the table above, the MLP model had a MAPE of 12.2%. The RNN model with LSTM was able to reduce the error metric by 50% to 7.8%. Finally, the transformer model was able to reduce the error metric further to 5.2%. The propensity estimated by evaluated models is the raw count, which is then normalized based on a sum of all category propensities at user level.

Having determined the short-term scores 134 and the long-term scores 144 for each candidate category, the system then combines these two scores into the category selection score 149. In some embodiments, this combination is performed as a linear combination using the formula below. This combination approach provides configuration flexibility to balance the influence of the two models 130 and 140 in the recommendation process.

$$P_{r,p} = (1-\lambda)P_r + \lambda P_p \quad (2)$$

In equation (2) above, $P_r$ represents the short-term relevance score of a particular category and $P_p$ represents the long-term propensity score of the user for the particular category. The λ parameter controls the relative influence of each score in the category selection score 149. In some embodiments, a top number of recommendation categories 150 are selected for the GUI 190 based on their selection scores 149.

In some embodiments, the recommendation system may employ different user models for different aspects of a content category. For example, a first user may be used to generate a propensity score based on just the content category based on the content type of the category, and a second model may be used to generate a propensity score based on just the acquisition option of the category. The content type, in particular, is an important dimension for recommendation selection according to empirical evidence, as users will exhibit different streaming behavior for movies as opposed to shows, which require a lot more commitment in terms of time. When user modeling is performed for distinct dimensions of the content category in this manner, the different propensity scores can be combined using a linear combination, as shown below.

$$P_{r,p} = (1-\lambda_1-\lambda_2)P_r + \lambda_1 P_p^c + \lambda_2 P_p^a \quad (3)$$

In equation (3) above, $P_p^c$ and $P_p^a$ are the long-term user propensity scores for a content category based on the category's content type and acquisition option, respectively. These two components are linearly combined using configurable weights $\lambda_1$ and $\lambda_2$ to obtain the category selection score. In some embodiments, the weights of the linear function may also be tuned programmatically over time using one or more machine learning techniques, and the weights may be personalized for individual users.

In one study, the tradeoff between the relatively influence of the three model scores in equation (3) was analyzed by varying the configurable weights $\lambda_1$ and $\lambda_2$. To account for the category's content type and acquisition option together, equation (3) was applied in a simulation process to evaluate the effect of the three-way balance of model scores on conversion results. A Pareto frontier representing the best trade-off points were determined from the results. The Pareto frontier was then used to choose sets of weight values as treatments for online A/B testing on different populations of live customers.

Turning back to FIG. 1, in some embodiments, the category selection score 149 may be determined based on another scoring component 148 generated by a content exploration model 146. While the user history-based models 130 and 140 rely on extrapolating observed user behaviors, they cannot recommend exploratory content for a user that is not in the user's interaction history. For example, if the user has not ever streamed a type of TV show, the user history-based models will score that content category with low propensity scores, so that the system will never recommend new content to the user. To address this limitation, embodiments of the system 100 will generate an exploration scoring component 148 of the category selection score 149 to enable the inclusion of new content categories for exploration.

Depending on the embodiment, the new content categories for exploration may be identified according to configuration input, a matching of user data and content data, or another machine learning model such as content exploration model 146. In some embodiments, the content exploration model 146 may use actual user feedback (e.g. user conversion in response to previous recommendations) to identify new content for exploration.

In some embodiments, the content exploration model 146 may implement an exploration-exploitation algorithm to determine the exploration scoring component. One example of such an algorithm is the Upper Confidence Bound (UCB) method for solving the multi-armed bandit problem. In the UCB method, a player chooses to pull an arm on a set of bandit machines based on the upper confidence bound of the expected returns associated with each arm. Based on the UCB method, the selection score formula may be modified as follows:

$$\tilde{P}_p = P_p + c\sqrt{\frac{1}{N}} \quad (4)$$

In equation (4), $P_p$ is the propensity score predicted by the model for a specific content category, N is the number of recommendations of the specific content category made to the user in a previous time period (e.g. the last month), and c is a hyperparameter used to control the amount of exploration. Note that the resulting score decreases with increasing number of recommendations, so that the amount of exploration decreases over time.

In one study, the effects of this content exploration feature in the recommendation system was evaluated. The study sampled 200,000 homepage generations in the U.S. marketplace over a month in 2023. The results of the study indicated that content exploration recommendations increased user streaming rates for certain content categories (e.g. third-party channel subscription content) without significantly detracting from the users' engagement with known content categories.

Turning back to FIG. 1, once the set of content categories for recommendation 150 have been selected, the recommendation system populates each of the selected categories with a selection of respective content items or titles. This population may be performed using another machine learning model 152, which may be trained to select the most relevant content items for each category based on user history data (e.g. the short-term user history data 132) and possibly other types of data (e.g. user demographic data and title feature data).

As shown, after the selected content categories are populated, the recommendation process enters the item-aware GUI composition stage 160, where an item-aware category ranking model 170 is executed to rank each of the selected categories for placement (e.g. as carousels) on the recommendation GUI 190. In some embodiments, the ranking model 170 is a ResNet-based model that outputs a score for each carousel by using various title, user, and context features. In some embodiments, the ranking score may be based on the category selection score 149 determined during the category selection stage 120.

In some embodiments, the ranking score is further modified by a content placement diversification component 172, which is used to implement one or more content diversity requirements of the recommendation GUI. For example, the diversification requirements may specify that the neighboring content categories on the GUI should not be of the same content type or be associated with the same acquisition option. To implement such content diversification requirements, the diversification component 172 may implement a "maximum marginal relevance" approach that iteratively constructs the GUI by adding one content category at a time to the GUI data 180. A priority queue is maintained for each content category to be added, where the queue is sorted based on the rank score, which may be calculated as below. At each iteration, the highest priority category is popped from the queue and added to the GUI, and the rank scores are recalculated.

$$P_{r,p} = \gamma P_r + (1-\gamma)(1-P_g)(1-P_n) \quad (5)$$

In equation (5) above, $P_{r'}$ is the rank score initially calculated by the ranking model 170, $\gamma$ is a control parameter to control the relative amounts of diversity and relevance on the GUI. Higher value of $\gamma$ favors relevancy and lower value of $\gamma$ favors diversity. In this example, two terms are used for the diversity criterion: one at the global level (e.g. the entire content page), and another at the neighborhood level (e.g. a specified number of categories placed in a proximal neighborhood on the GUI). For example, $P_g$ may indicate the percentage of the selected categories having the same content type, acquisition option, or populated items as a given category that has already been added to the GUI, and $P_n$ may indicate the percentage of such categories that have been added to the placement neighborhood of the given category (e.g. within the previous two slots). The combination of the two terms helps to promote content diversity at both the page and neighborhood levels. This content diversification approach may be used to implement content diversification on the GUI based on different content category dimensions and using different types of diversification criteria.

During a study of the recommendation system that implemented the content diversification feature 172, it was shown that content diversification led to higher user conversion rates. In some embodiments, control parameters of the diversification process can be configured via a configuration interface of the system. In some embodiments, the control parameters may be varied to select test treatments for A/B testing of live users.

Finally, when all of the selected content categories 150 have been added to the GUI data 180, the GUI data 180 is used to generate the recommendation GUI 190, which lists the selected content categories in rank order, populated with selected content items (e.g. as carousels of titles). As discussed, in some embodiments, the GUI 190 may be the homepage of a video streaming service. The GUI data 180 may be a webpage formatted at least in part in HTML, and transmitted to a user streaming device via the HTTP protocol. The user streaming device may be a device such as a smart TV or a specialized streaming device adapted to communicate with the streaming service over the Internet. The GUI 190 may allow the user to select content items (e.g. movie titles) for streaming to the user device.

Figure 2:
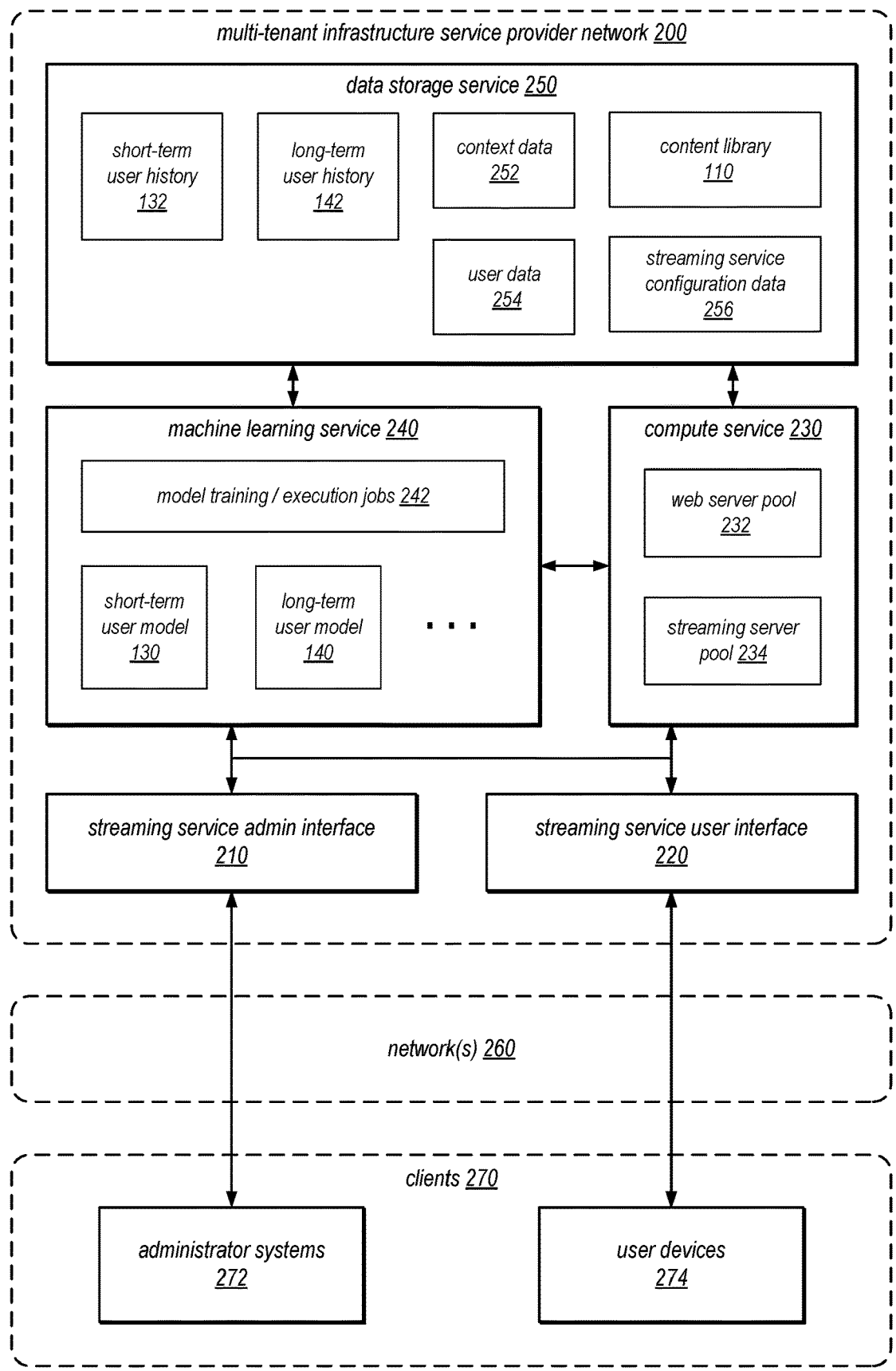
FIG. 2 illustrates components of a content streaming service implemented in a multi-tenant infrastructure service provider network that uses the machine learning pipeline, according to some embodiments.

FIG. 2 illustrates components of a content streaming service implemented in a multi-tenant infrastructure service provider network 200 that uses the machine learning pipeline, according to some embodiments.

The multi-tenant infrastructure service provider network 200 may be a private or closed system or may be set up by an entity such as a company or a public sector organization to provide one or more computing infrastructure services (such as various types of cloud-based storage) accessible via the Internet and/or other networks to clients 270 in client premises networks, in some embodiments. Service provider network 200 may be implemented in a single location or may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may implement various computing systems, resources, or services, such as a virtual private cloud (VPC) service, one or more compute service(s) 230, data storage service(s) 250, machine learning service 240, as well as other types of services. As shown in this example, the services of the provider network are used to implement components of a content streaming service that streams digital content to user devices 274 and uses machine learning models to generate content recommendations to the user devices.

In various embodiments, the components illustrated in the figure may be implemented directly within computer hardware, as instructions directly or indirectly executable by computer hardware (e.g., a microprocessor or computer system), or using a combination of these techniques. For example, the web servers 232 and streaming servers 234 may be implemented by computing nodes (or simply, nodes) such as virtual machines or containers. In various embodiments, the functionality of a given system or service component may be implemented by a particular node or may be distributed across several nodes. In some embodiments, a given node may implement the functionality of more than one service system component (e.g., more than one data store component).

The compute service(s) implemented by service provider network 200 offer instances, containers, and/or functions according to various configurations for client operations. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operating system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions of service provider network 200 in different embodiments, including general purpose or special purpose computer servers, storage devices, network devices and the like.

The web servers 232 in this example may be programmed to implement the GUI data 180 that contains the content category recommendations discussed previously. In some embodiments, the recommendation GUI 190 is generated as a webpage that is transmitted to the user devices 274 over the Internet. The GUI 190 may be implemented as part of the user interface 220 of the streaming service. The user interface 220 may allow users to select content items to stream, and the actual streaming operations may be handled by a pool of streaming server 4. The machine learning models used by the recommendation process may be invoked by the web server 232 during the course of constructing a webpage, for example, using various service calls. The webpage may be generated in response to requests from the user devices 274, for example, whenever a user logs in to his or her streaming service account or conducts a search for content via the webpage.

To implement the VPC service, the service provider network 200 provides a physical or substrate network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be logically isolated from the rest of the service provider network, for example it may not be possible to route from a substrate network address to an address in a production network that runs services of the service provider, or to a customer network that hosts customer resources.

The VPC service may implement one or more client networks as overlay networks of virtualized computing resources (e.g., compute instances provided by the compute service(s), block store volumes, data objects such as snapshots and machine images, file storage, databases provided by the database or data storage service(s) 250) that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along the substrate network according to constructs in the overlay network (e.g., VPCs, security groups). A mapping service may be used to coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the service provider network for routing packets between endpoints.

In some embodiments, the data storage service 250 may be implemented using various types of data storage and processing systems to provide general or specialized data storage and processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, the data storage service 250 may implement various types of databases (e.g., relational, NoSQL, document, or graph databases) for storing, querying, and updating data. Such services may be enterprise-class database systems that are scalable and extensible. Queries may be directed to a database in data store service 250 that is distributed across multiple physical resources, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via APIs. In other embodiments, external applications and programs may submit queries using Open Database Connectivity (ODBC) and/or Java Database Connectivity (JDBC) driver interfaces to the database system.

As shown in this example, the data storage service 250 is used to house different types of data including the content library 110, the short-term user history data 132, and the long-term user history data 142. The data storage service 250 may also be used to store user data 254 about the users such as demographics or user preference data, context data 252 associated with recommendations or user sessions, and configuration data 256 that controls the operations of the streaming service. Depending on the embodiment, some or all of this data may be used by the machine learning models of the streaming service as training or inference input data. In some embodiments, the data stored in the data storage service 250 is protected via appropriate access control mechanisms, for example, so that one advertiser client cannot access the data of another advertiser client without proper authorization.

In some embodiments, the machine learning service 240 may be used to manage the machine learning models used by the recommendation process, for example the short-term user model 130 and the long-term user model 140. The machine learning service 240 may be capable of performing a variety of machine learning tasks for different tenants using the resources of the service provider network 200, such as preparing ML data, configuring, training, and hosting various types of ML models, performing ongoing model management such as periodic evaluation and retraining, among other tasks. The machine learning service 240 may offer a variety of tools for developing and monitoring ML models, such as tools to monitor the performance of a ML model and/or interpretation and explanatory tools to explain why a ML model made certain decisions. In some embodiments, the machine learning service 240 can be used to maintain custom versions of machine learning models for specific groups of users or content categories. As shown, these models may be executed and trained according to client-specified model training or execution jobs 242, which may be specified in a service-defined language.

As shown, in some embodiments, the streaming service may provide an administrator interface 210 that allows system administrators to manage operations of the service from administrator systems 272. The administrator interface 210 may allow an administrator to configure various aspects of the machine learning pipeline described previously, such as model hyperparameters or model weights. In some embodiments, the administrator interface 210 may allow administrators to perform a variety of management tasks such as reviewing model performance, configure model parameters, make deployment changes to the models, perform online or offline training of the models, and perform A/B testing of users, among other tasks.

Generally speaking, the clients 270 may encompass any type of client configurable to submit network-based requests to service provider network 200 via network 260. For example, a given client device may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in service provider network 400 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. As shown, the clients 270 in this example includes administrator systems 272 and various user devices 274 associated with users, which may be streaming customers of the streaming service. User device systems 474 may include a variety of computer systems such as personal computers, smartphones, smart TVs, specialized streaming devices, and the like.

As shown, the clients 270 are able to convey network-based services requests to and receive responses from service provider network 200 via network 260. In various embodiments, network 260 may encompass any suitable combination of networking hardware and protocols necessary to establish network-based communications between clients 270 and service provider network 200. The network 260 may generally encompass the various telecommunications networks and service providers that collectively implement the Internet. Network 260 may also include private networks such as local area networks (LANs) or wide area networks (WANs) as well as public or private radio or wireless networks. For example, a given client 270 and service provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and service provider network 200. It is noted that in some embodiments, clients 270 may communicate with service provider network 200 using a private network rather than the public Internet.

Figure 3:
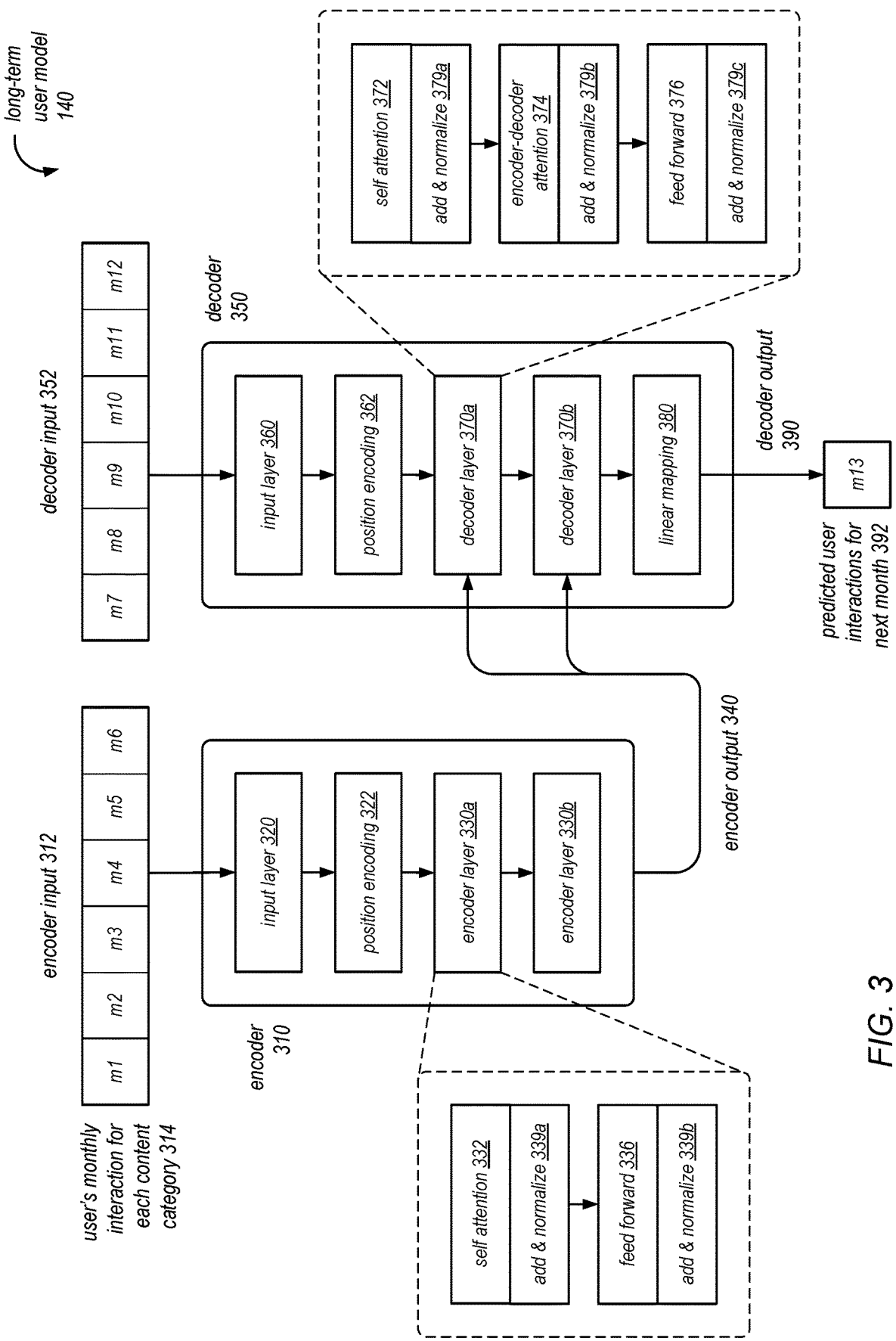
FIG. 3 illustrates a transformer neural network used to implement a long-term user model of the machine learning pipeline, according to some embodiments.

FIG. 3 illustrates a transformer neural network used to implement a long-term user model 140 of the machine learning pipeline, according to some embodiments.

As shown, the architecture of the transformer model includes two parts: an encoder portion 310 and a decoder portion 350. As discussed, transformer models are traditionally used to perform language translation tasks from a source language sequence of words to a target language sequence of words. In this context however, the model learns to translate the user's observed interaction history to the user's future interactions. The model architecture takes as input the user's monthly content category interaction history for the past twelve months 314, which is divided into the first six months and the last six months. As shown, the first six months are consumed by the encoder 310 as sequential input 312, and the last six months are consumed by the decoder 350 as sequential input 314. The model then generates decoder output 390, which indicates the model-predicted user interaction 392 for one month into the future (the thirteenth month).

As shown, the encoder portion includes an input layer 320 that receives each month's interaction data in the encoder input sequence 312 and encodes an input embedding (i.e. an intermediate feature vector). A position encoding layer 322 is then used to encode the feature vector with positional information, so that the model can recognize the relative position of the monthly data in the monthly sequence, which may have semantic meaning in the sequence. The position-encoded feature vector is then processed by two encoder layers 330*a* and 330*b*, each of which contains sub-layers, as shown. In some embodiments, more than two encoder layers 330 may be used in the encoder 310. For example, six encoder layers may be used to process the six months in the encoder input sequence 312, in some embodiments.

The self-attention layer 332 is an attention mechanism that allows the encoder to focus on different months in the input sequence 312 with varying degrees of attention. The self-attention layer generates multiple attention vectors for multiple months in the sequence to capture the contextual importance of different months in the sequence. The attention vectors are then applied to the intermediate feature vectors of each month by the feed forward layer 336. As shown, the output of each sub-layer is added to the input of the sub-layer and then normalized, using the add and normalized layers 339*a* and 339*b*. The output of the encoder 340 is then provided as input to the decoder layers 370*a* and 370*b*.

As shown, the decoder portion 350 includes an input layer 360 that receives each month's interaction data in the decoder input sequence 352 and generates intermediate feature vectors for each month. As with the encoder 310, a position encoding layer 362 is used to encode the feature vector with positional information. The position-encoded feature vector is then processed by two decoder layers 370*a* and 370*b*, each of which contains sub-layers, as shown. In some embodiments, more than two decoder layers 370 may be used in the decoder 350. For example, six decoder layers may be used to process the six months in the decoder input sequence 352, in some embodiments.

The self-attention layer 372 in the decoder layers 370 serve a similar function as the self-attention layer in the encoder layers 330. However, the decoder layer 370 also includes an encoder-decoder attention layer 374, which allows the decoder to attend to different positions in the decoder input sequence with varying amounts of attention, based on both the previous months in its own input sequence 352 and the encoder output 340 for the first six months. In some embodiments, the attention mechanisms of the decoder layers 370 implement masking so that the decoder inferences for one month can only depend on known outputs for previous months. As shown, the decoder layers 370 also includes a feed forward layer 376 similar to the feed forward layer 336 of the encoder layers 330, and each of the sub-layers are followed by an add and normalize layer 379*a*, 379*b*, and 379*c*, which performs a similar function as sub-layers 339 in the encoder layers 330.

Finally, the output of the decoder layers 370 are processed by a linear mapping layer 380, which is another feed forward layer that transforms the decoder layer output into the final output form (i.e. a user propensity feature vector for the content categories for the thirteenth month). In some embodiments, the model may be modified to generate sequence output (e.g. to generate the user propensity for multiple months into the future), so that the user propensity score for a content category is based on predicted user interactions for multiple future months.

In some embodiments, the transformer model is trained based on multi-output regression using a MSE loss function. The training data for training the model may be sampled for selected sets of users (possibly randomly) without imposing a sliding window on the sampling time range.

Figure 4:
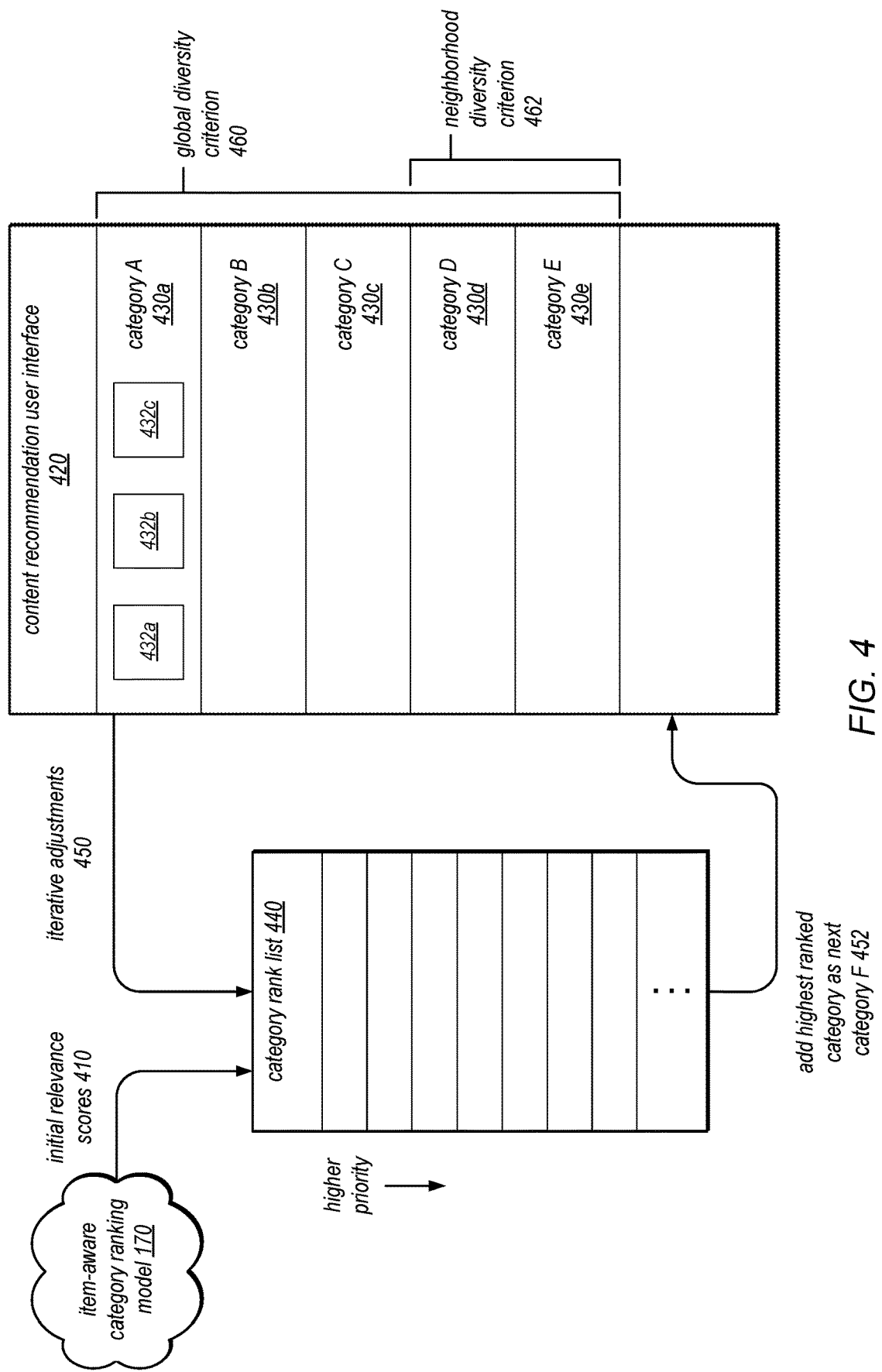
FIG. 4 illustrates a diversification process used by the content recommendation system to implement content diversity on the content recommendation user interface, according to some embodiments.

FIG. 4 illustrates a diversification process used by the content recommendation system 100 to implement content diversity on the content recommendation user interface 420, according to some embodiments. The depicted process may be implemented by an embodiment of the content placement diversification component 172 of FIG. 1.

As shown, the process begins with an initial ranking of the content categories (e.g. selected categories 150) to be added to the recommendation user interface 420 (e.g. GUI 190). This initial ranking may be performed based on a relevance score 410 for the categories generated by the item-aware category ranking model 170. As discussed, model 170 may generate these ranking scores based on a relevance of a category to the user, and may be dependent on the list of content items (e.g. content items 432*a-c*) used to populate the category and other recommendation context information. The rank list 440 may be stored as a priority queue of the content categories, where higher ranked categories in the queue are placed higher (e.g. in more prominent locations) on the user interface 420.

Once the initial ranking is performed, the process iteratively adds the highest ranked category in the ranked list 440 to the user interface 420, one at a time. As shown in the figure, the iterative process has already placed a number of content categories 430*a-e* on the user interface 420, and is adding the next category 425 to the user interface based on its highest rank in the priority queue.

As shown, in each iteration of the iterative process, adjustments 450 are made to the rank list 440. The adjustments may be made by adjusting the initial relevance scores 410 of the remaining categories in the priority queue, based on what categories 430 have already been added to the user interface. In some embodiments, the adjustments may incorporate one or more content diversification factors to the rank scores, for example, using equation (5) discussed above. The adjustments may be made to promote one or more content diversity criteria on the user interface, which may include a global diversity criterion 460 for the entire user interface and a neighborhood diversity criterion for just a local neighborhood (e.g. a neighborhood of three adjacent carousels) on the user interface. The type of diversity criteria implemented for the user interface 420 may be configurable and vary from user to user. For example, in some cases, the diversity criteria may aim to minimize the amount of content item overlap between neighboring content categories. As another example, the diversity criteria may encourage exploratory content categories (e.g. categories identified by the content exploration model 146) to be placed next to non-exploratory content categories.

Figure 5:
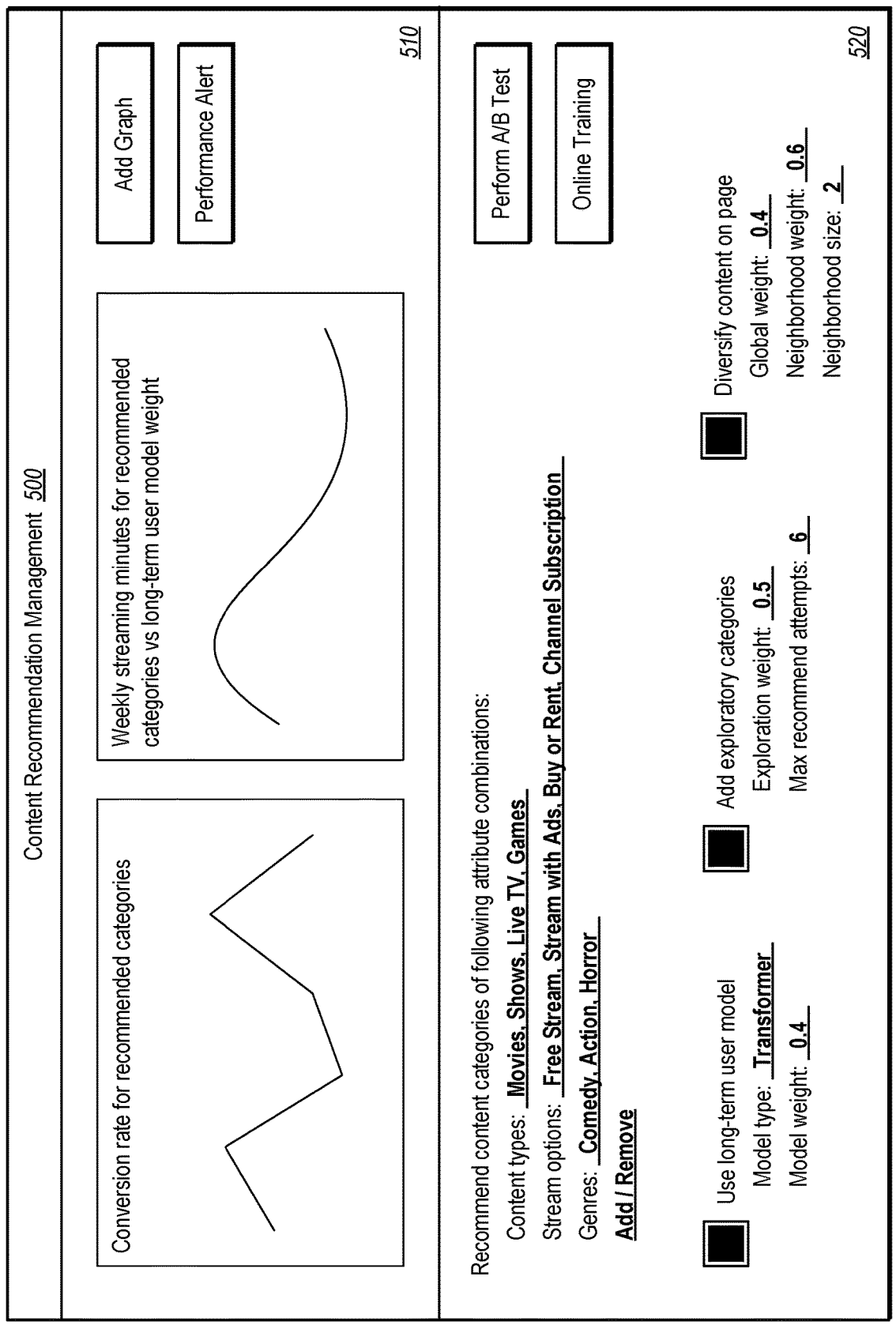
FIG. 5 illustrates an example system management interface of the content recommendation system, according to some embodiments.

FIG. 5 illustrates an example system management interface 500 of the content recommendation system 100, according to some embodiments. The depicted interface 500 may be implemented as part of the streaming service administrator interface 210 discussed in connection with FIG. 2.

As shown in this example, the management interface 500 allows administrators to manage the content recommendation capabilities of a video streaming service. The top portion 510 of the management interface allows an administrator to create various performance graphs to view the performance of the content recommendation system. The performance data used to generate the graphs may include a combination of operational log data captured by the system (e.g. model decision data associated with the recommendation pipeline) and result data observed from actual users (e.g. conversion rates of recommended content or "share of voice" metrics associated with recommended categories). In this example, the GUI also allows the administrator to set certain performance alerts, so that when a certain type of specified alert condition is detected based on performance monitoring, an alert is generated to subscribed administrators so that corrective action may be taken. In some embodiments, these types of performance alerts may be used to automatically trigger programmatic actions within the recommendation system, for example, to automatically turn off a portion of the model pipeline when recommendation performance metrics drop below a specified threshold.

As shown in this example, the bottom portion 520 of the management interface allows the administrator to make manual adjustments to the model pipeline. In this example, the management interface allows the administrator to define how the content categories are defined in terms of combinations of content attributes.

As shown, the management interface 520 allows the administrator to configure various operational parameters of the recommendation system pipeline. For example, the management interface here allows certain models or steps in the recommendation pipeline to be selectively enabled or disabled. Moreover, the management interface allows the administrator to specify the type of model used to implement a particular processing step in the pipeline, weights for aspects of the processing steps (e.g. the weights used in equations (2)-(5)), and other types of configurable operational parameters (e.g. max number of recommendation attempts for content exploration and the neighborhood size to use for content diversification).

As shown, the management interface 520 also allows the administrator to perform A/B testing of users and perform online training of models in the recommendation pipeline. In some embodiments, an A/B test may be initiated from the management interface to test two or more sets of recommendation system parameter settings on two or more user populations. The results of the A/B testing may be presented as performance graphs. In some embodiments, the parameter settings used for the A/B testing (i.e. test treatments) may be selected based on simulations performed based on different configurations of the recommendation pipeline.

In some embodiments, the online training may be enabled to allow one or more models in the pipeline to be updated in response to actual results. For example, a newly introduced model in the pipeline may be trained further through an online training to fine tune its operating parameters (e.g. model weights). In some embodiments, online training may be automatically initiated based on specified conditions (e.g. low recommendation performance) or periodically according to a set training schedule.

Figure 6:
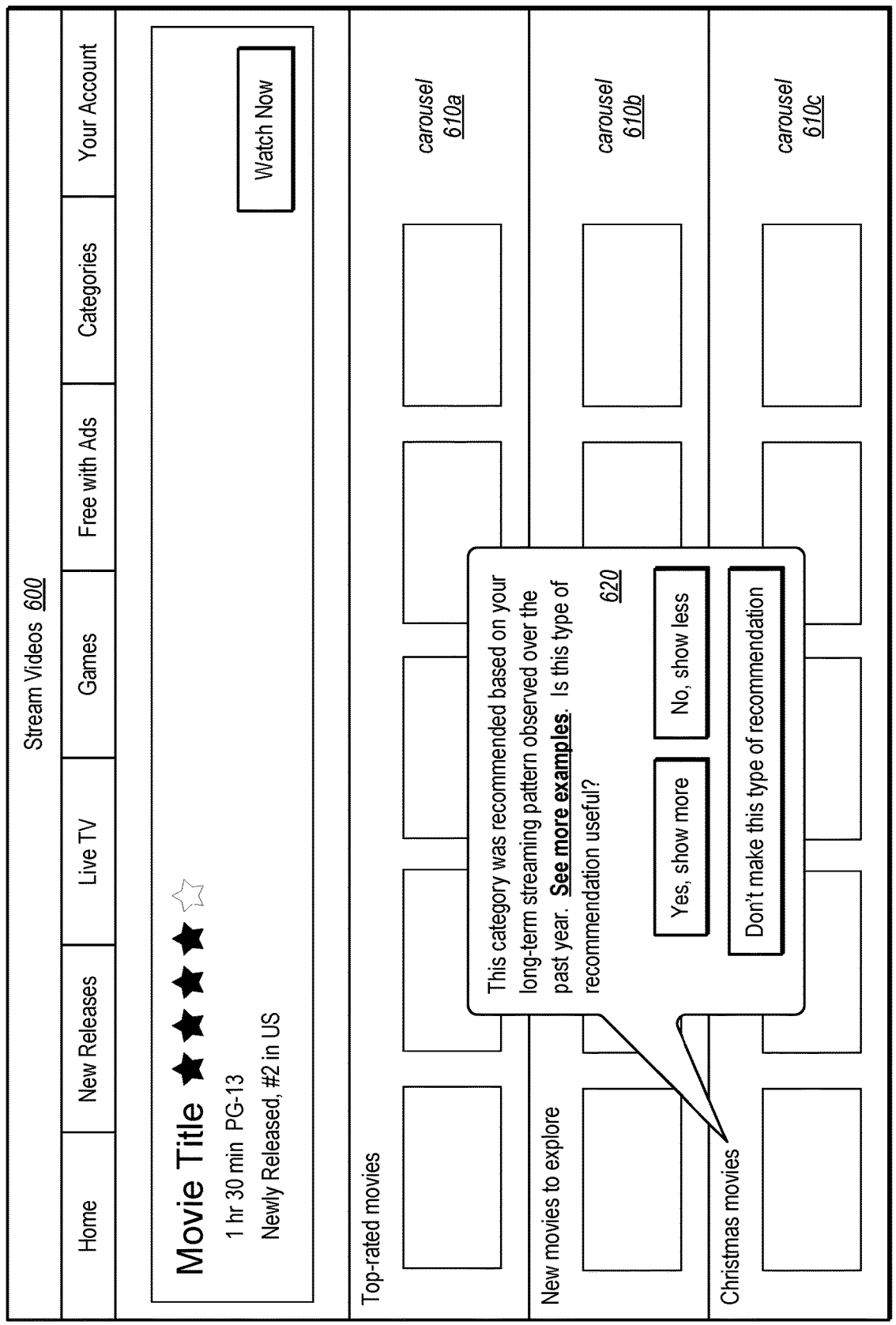
FIG. 6 illustrates an example user interface of a video streaming service that implements the content recommendation system, according to some embodiments.

FIG. 6 illustrates an example user interface of a video streaming service 600 that implements the content recommendation system 100, according to some embodiments. The depicted interface 600 may be implemented as part of the streaming service user interface 220 discussed in connection with FIG. 2.

As discussed, in some embodiments, user interface 600 may be generated as a personalized service homepage of the user. As shown, the user interface 600 displays a number of carousels 610a-c of recommended content for the user. Each carousel 610 may correspond to a content category selected by the recommendation system 100. Each carousel is populated with a list of selected content items (e.g. movies), which can be streamed to the user's streaming device in response to user selection.

As shown, in this example, the user interface 600 allows the user to receive an explanation of why a particular content category was recommended to the user. This level of explanation is made possible by the pipeline architecture of the model, which decomposes the recommendation decision into a distinct set of logical recommendation objectives. As a result, the recommendation system is easily able to identify the reasons (e.g. the primary objectives) that led to the selection of a particular recommended category. As shown, in this example, the system indicates to the user that the Christmas movies category was recommended based on a modeling of the user's long-term streaming patterns observed over the past year. The explanation also provides the user the option of viewing more examples of content recommendations based on the user's long-term model, so that the user can get a better sense of what this type of modeling is learning about the user. Additionally, the user interface also provides the user some degree of configuration control over the recommendation system, here, by allowing the user to provide feedback regarding how useful the long-term user model is. Such user feedback may be used to adjust the model weights of the long-term user model or disable the model altogether.

Figure 7:
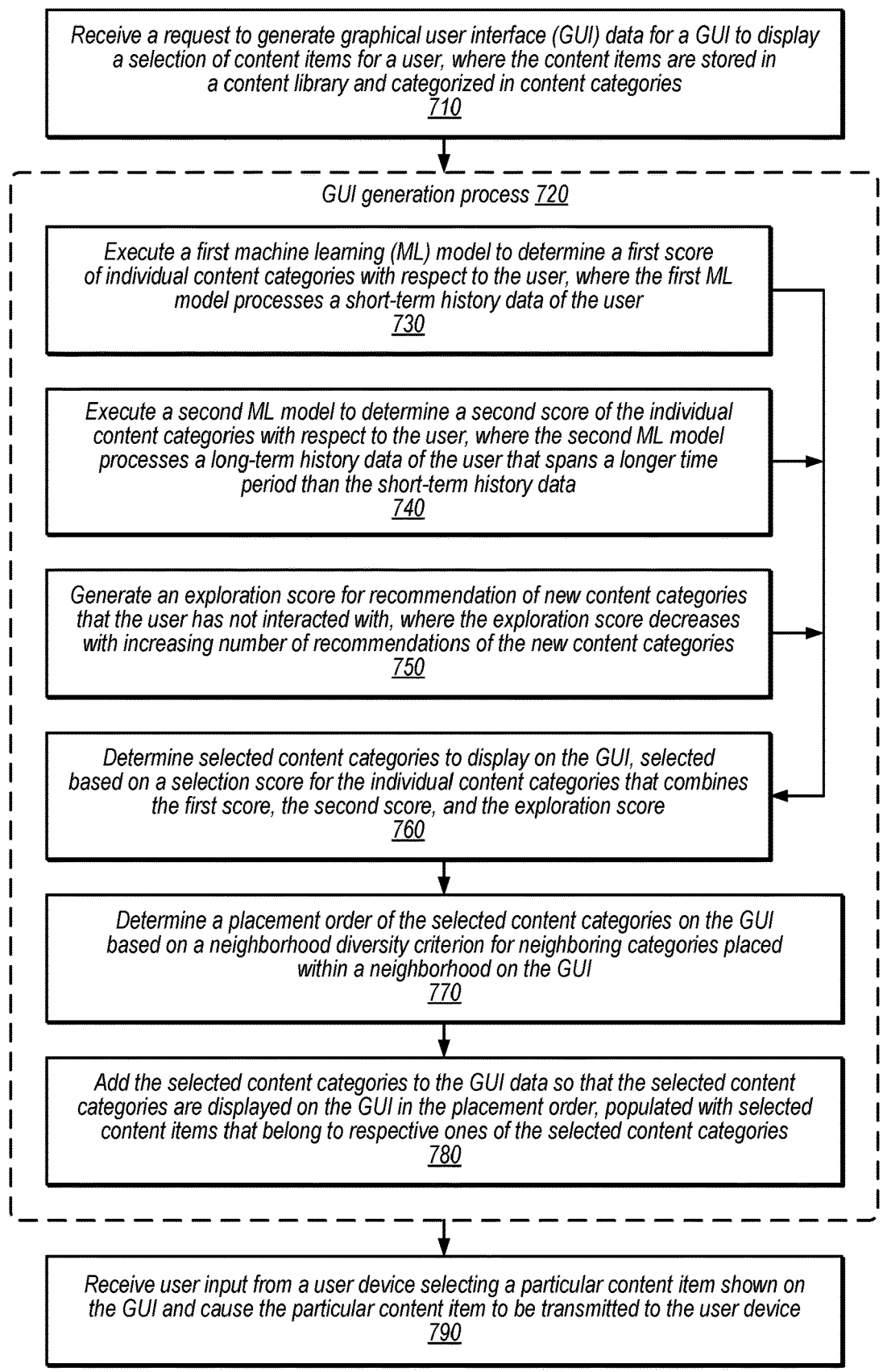
FIG. 7 is a flowchart illustrating a process of the content recommendation system generating a GUI of recommended content using the machine learning pipeline, according to some embodiments.

FIG. 7 is a flowchart illustrating a process of the content recommendation system 100 generating a GUI of recommended content (e.g. GUI 190 or GUI 600) using the machine learning pipeline, according to some embodiments.

The process begins at operation 710, where the system receives a request to generate graphical user interface (GUI) data for a GUI to display a selection of content items for a user. In some embodiments, the GUI is a user homepage of a streaming service webpage that provides content recommendations to the user and allows the user to select individual content items for streaming. The content items may be stored in a content library (e.g. content library 110), and the content items may be categorized in content categories (e.g. categories 114). In some embodiments, the GUI data may be generated when the user first logs on to the streaming service, and may be regenerated during the user session in response to various user requests (e.g. page refreshes or content search requests).

As shown, operations 730 to 780 are executed as part of a GUI generation process, which may involve the system generating a webpage for display on the user streaming device (e.g. user device 274). At operation 730, the system executes a first machine learning (ML) model (e.g. short-term user model 130) to determine a first score of individual content categories with respect to the user, where the first ML model processes a short-term history data of the user (e.g. short-term user history data 132). At operation 740, the system executes a second ML model (e.g. long-term user model 140) to determine a second score of the individual content categories with respect to the user, where the second ML model processes a long-term history data of the user (e.g. long-term user history data 142) that spans a longer time period than the short-term history data. The two models may be of different architectures. In some embodiments, the short-term user history data may include user interactions with the content categories for a short period of time such as days, weeks, or months. In some embodiments, the long-term user history data include user interactions with the content categories for a period of one year or more. In some embodiments, the models may be executed by a machine learning service implemented by a multi-tenant infrastructure service provider network (e.g. provider network 200).

At operation 750, the system generates an exploration score that enables recommendation of new content categories that the user has not interacted with previously. The exploration score may be generated using another machine learning model (e.g. content exploration model 146), using an exploration-exploitation algorithm. In some embodiments, the algorithm used is a version of the UCB algorithm for the multi-arm bandit problem. In some embodiments, the exploration score is generated so that its value decreases with increasing number of recommendations of the new content categories, for example as shown in equation (4).

At operation 760, selected content categories are determined for display as recommended categories on the GUI. The selection is performed based on a selection score for the individual content categories (e.g. selection score 149), which combines the short-term score of the category, the long-term score of the category, and the exploration score of the category. In some embodiments, one or more of these scores may be further decomposed for different categorical properties of the content category, as shown for example in equation (3). In some embodiments, the combination of the scores may be performed using a linear combination formula, where configurable weights are used to balance the relative importance of the scores.

At operation 770, the system determines a placement order of the selected content categories on the GUI. The placement order may be determined after the selected content categories are populated with content items, and may be dependent on the content items used to populate the categories. In some embodiments, the placement order may be determined based on an iterative process as shown in FIG. 4, which implements a neighborhood diversity criterion for neighboring categories placed within a neighborhood on the GUI. For example, the neighborhood diversity criterion may specify that content categories placed within a block of three adjacent slots (e.g. carousels) should not share certain categorical characteristics or an excessive number of common content items.

At operation 780, the system adds the selected content categories to the GUI data so that the selected content categories are displayed on the GUI in the placement order, and populated with selected content items that belong to respective ones of the selected content categories. In some embodiments, this operation is performed by a web server (e.g. web servers 232), and the GUI data is transmitted to the user streaming device as one or more webpages, via the Internet.

Finally, at operation 790, the system receives user input from the user device selecting a particular content item shown on the GUI, and causes the content item to be transmitted to the user device. As discussed, in some embodiments, the GUI (e.g. GUI 600) may allow users to select content items (e.g. movie titles) for streaming. When the user selects a title, the streaming service will establish a connection with the user device and initiate streaming of the title to the user device (e.g. via a streaming server 234).

Figure 8:
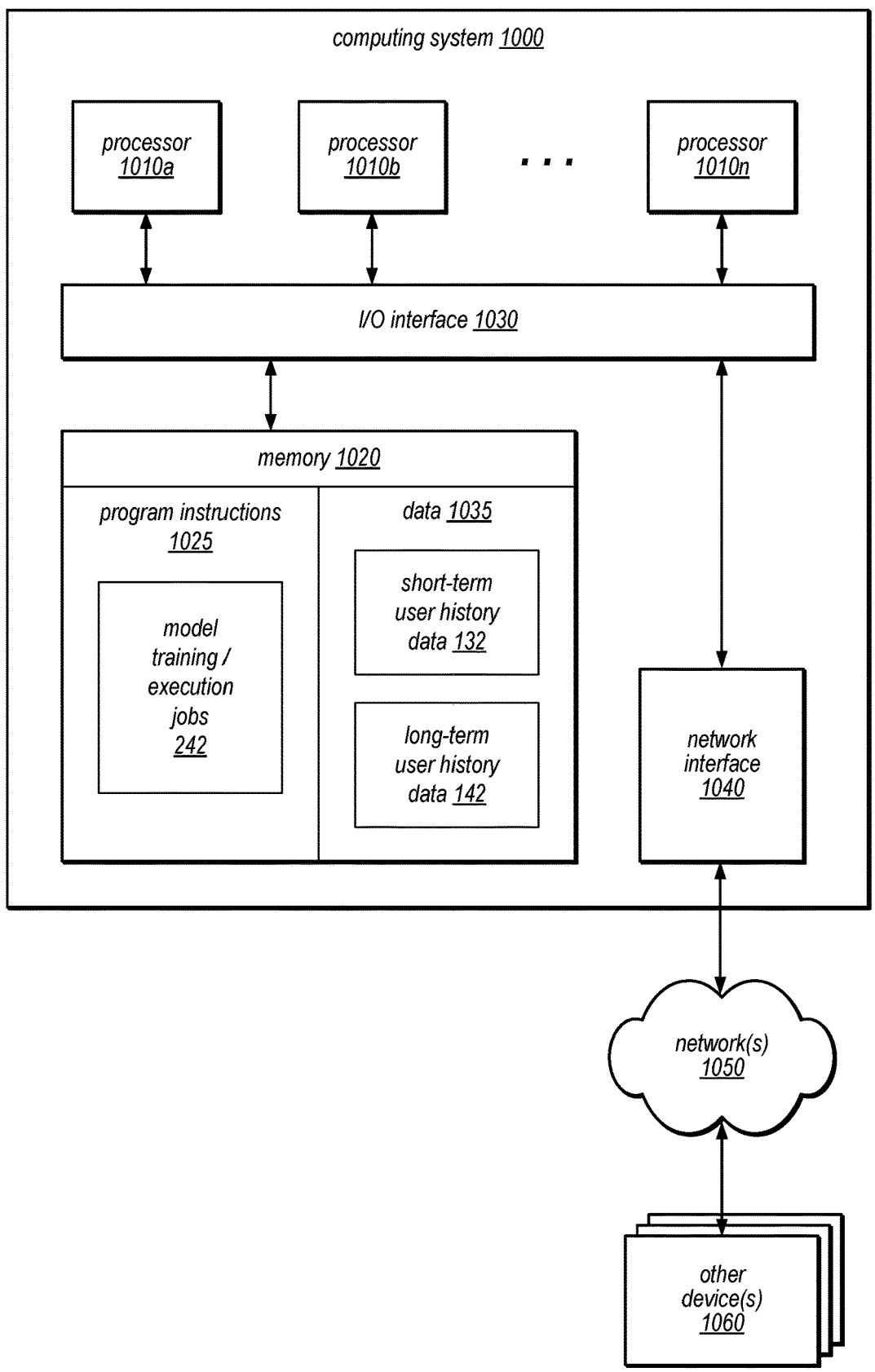
FIG. 8 is a block diagram illustrating an example computer system that can be used to implement portions of the content recommendation system, according to some embodiments.

FIG. 8 is a block diagram illustrating an example computer system that can be used to implement portions of the content recommendation system 100, according to some embodiments.

Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035. As shown, in some embodiments, the program instructions memory 1025 may be used to implement model training or execution jobs 242 for the models used in the content recommendation system. As shown, in some embodiments, the data memory 1035 may be used to store data such as the model training or execution data for the models, such as the short-term user history data 132 and the long-term user history data 142.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more computer devices that implement a content recommendation system, configured to:
generate graphical user interface (GUI) data to display, via a GUI, a selection of content items for a user, wherein the content items are stored in a library and categorized into a plurality of content categories, wherein the generation of the GUI data includes to:
execute a first machine learning (ML) model to determine a first score of individual content categories with respect to the user, wherein the first ML model processes a short-term history data of the user;
execute a second ML model to determine a second score of the individual content categories with respect to the user, wherein the second ML model processes a long-term history data of the user that spans a longer time period than the short-term history data;
determine selected content categories to display on the GUI, wherein the selected content categories are selected based at least in part on a selection score for the individual content categories that combines the first score and the second score; and
add the selected content categories to the GUI data, so that the selected content categories are displayed on the GUI with selected content items that belong to respective ones of the selected content categories; and
in response to user input from a user device selecting a particular content item shown on the GUI, cause the particular content item to be transmitted to the user device.

2. The system of claim 1, wherein:
the content recommendation system is implemented as part of a video streaming service;
the content items include videos provided by the video streaming service; and
the selected content categories are displayed on the GUI as carousels of content items.

3. The system of claim 1, wherein:
the second ML model comprises a transformer neural network;
the transformer neural network consumes as input a time series of user interaction data of the user over last twelve months;
the transformer neural network outputs a prediction of the user interaction data for a following month; and
the second score is a propensity score of the user for interacting with the individual content categories, determined based at least in part on the prediction.

4. The system of claim 1, wherein:
the content category of a given content item is based at least in part on a content type of the given content item and an acquisition option of the given content item;
the content type is one of a movie, a show, or a live program; and
the acquisition option is one of free streaming, streaming with ads, on-demand transaction, or channel subscription.

5. The system of claim 1, wherein:
the selection score includes an exploration score component that enables recommendation of a new content category that the user has not interacted with, and the exploration score component decreases with increasing number of recommendations of the new content category.

6. The system of claim 1, wherein to generate the GUI data, the content recommendation system is configured to:
determine a placement order of the selected content categories on the GUI, wherein the placement order implements a neighborhood diversity criterion for content categories placed within a neighborhood on the GUI.

7. A method comprising:
generating, by a system implemented by one or more computer devices, graphical user interface (GUI) data to display a selection of content items for a user via a GUI, wherein the content items are categorized into a plurality of content categories, including:
executing a first machine learning (ML) model to determine a first score of individual content categories with respect to the user, wherein the first ML model processes a short-term history data of the user;
executing a second ML model to determine a second score of the individual content categories with respect to the user, wherein the second ML model processes a long-term history data of the user that spans a longer time period than the short-term history data;
determining selected content categories to display on the GUI, wherein the selected content categories are selected based at least in part on a selection score for the individual content categories that combines the first score and the second score; and cause the selected content categories to be added the GUI data, so that the selected content categories are displayed on the GUI with selected content items that belong to respective ones of the selected content categories.

8. The method of claim 7, wherein:
the second ML model comprises a transformer neural network;
the transformer neural network consumes as input a time series of user interaction data of the user over last twelve months; and
the transformer neural network outputs a prediction of the user interaction data for a following month; and
the second score is a propensity score of the user for interacting with the individual content categories, determined based at least in part on the prediction.

9. The method of claim 8, wherein:
the transformer neural network includes an encoder portion and a decoder portion;
the encoder portion consumes as input a first six months of the time series; and
the decoder portion consumes as input a last six months of the time series.

10. The method of claim 7, wherein:
the selection score is determined based on a linear combination of the first score and the second score.

11. The method of claim 7, wherein:
the content category of a given content item is based at least in part on a content type of the given content item and an acquisition option of the given content item.

12. The method of claim 11, wherein:
the selection score for the given content item is determined based on a linear combination of a first propensity score associated with the content type and a second propensity score associated with the acquisition option.

13. The method of claim 7, wherein:
the selection score includes an exploration score component that enables recommendation of a new content category that the user has not interacted with, and the exploration score component decreases with increasing number of recommendations of the new content category.

14. The method of claim 13, wherein the exploration score component is determined according to an Upper Confidence Bound (UCB) algorithm.

15. The method of claim 7, wherein generating the GUI data comprises:
determining a placement order of the selected content categories on the GUI, wherein the placement order implements a neighborhood diversity criterion for content categories placed within a neighborhood on the GUI.

16. The method of claim 15, wherein determining the placement order comprises:
adding the selected content categories to a priority queue; and
iteratively selecting a next category from the priority queue to add to the GUI, wherein the next category has a priority value that is highest in the priority queue, and the priority value is determined based at least in part on (a) a relevance of the next category to the user and (b) one or more content categories placed within the neighborhood of the next category.

17. The method of claim 15, wherein:
the generation of the GUI data includes an item-agnostic stage performed before the selected content categories are populated with content items and an item-aware stage performed after the selected content categories are populated with content items;
the selected content categories are determined during the item-agnostic stage; and
the placement order is determined during the item-aware stage.

18. The method of claim 7, further comprising:
receiving configuration input via a configuration interface, wherein the configuration input specifies one or more of:
(a) a type of machine learning model to use to generate the first or second score,
(b) one or more content categories to use for content selections,
(c) one or more parameters for generating the selection score, and
(d) one or more parameters for determining placement of the selected content categories on the GUI.

19. The method of claim 18, further comprising performing A/B testing of the content recommendation system, wherein the A/B testing is performed on two or more groups of users under two or more sets of configuration parameters of the content recommendation system.

20. One or more non-transitory computer-accessible storage media storing program instructions that when executed on one or more processors of a content selection system, cause the content selection system to:
generate graphical user interface (GUI) data to display, via a GUI, a selection of content items for a user, wherein the content items are categorized into a plurality of content categories, including to:
execute a first machine learning (ML) model to determine a first score of individual content categories with respect to the user, wherein the first ML model processes a short-term history data of the user;
execute a second ML model to determine a second score of the individual content categories with respect to the user, wherein the second ML model processes a long-term history data of the user that spans a longer time period than the short-term history data;
determine selected content categories to display on the GUI, wherein the selected content categories are selected based at least in part on a selection score for the individual content categories that combines the first score and the second score; and
cause the selected content categories to be added to the GUI data, so that the selected content categories are displayed on the GUI with selected content items that belong to respective ones of the selected content categories.

* * * * *